July 13, 1965  G. H. SUDMEIER  3,195,035
MOTOR CONTROL SYSTEM
Original Filed May 13, 1958  2 Sheets-Sheet 1
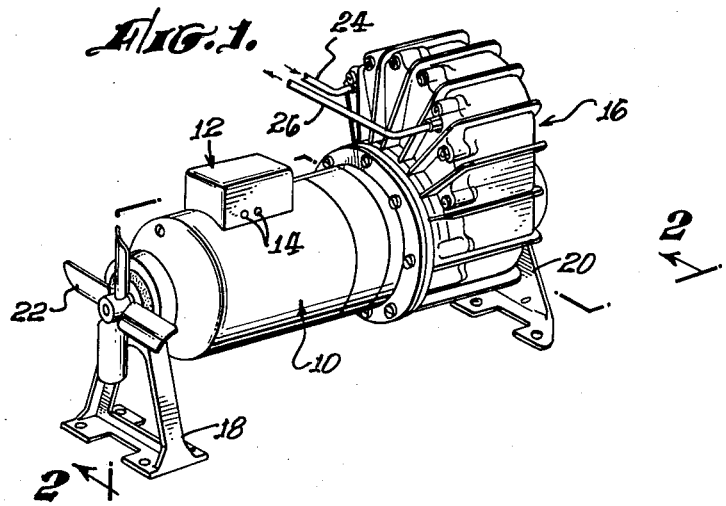
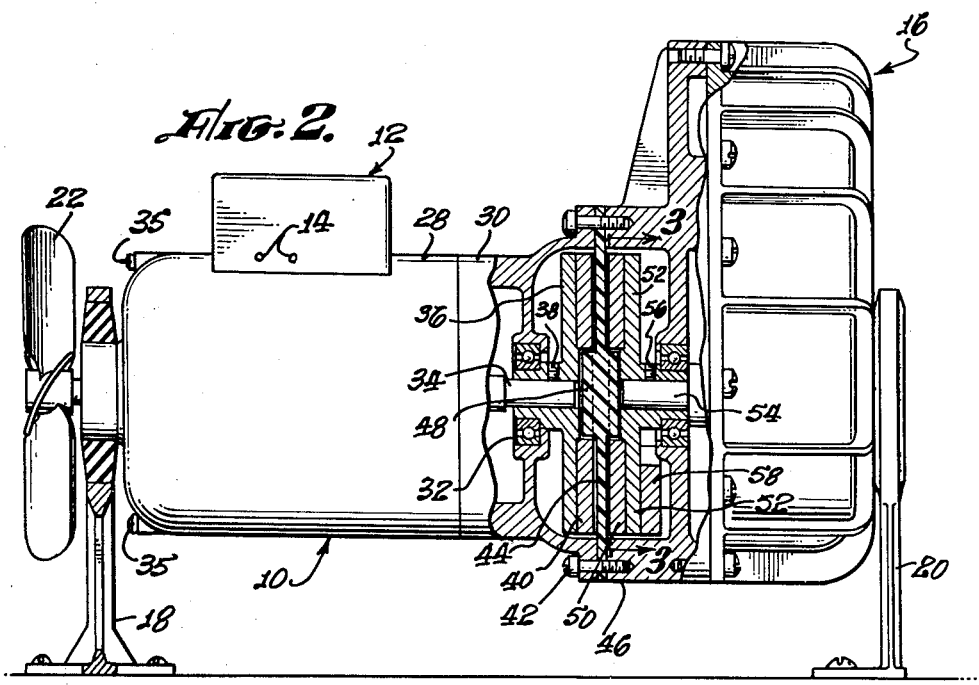
GUSTAV H. SUDMEIER,
INVENTOR.
BY Nilsson & Robbins
ATTORNEYS.

July 13, 1965        G. H. SUDMEIER        3,195,035
MOTOR CONTROL SYSTEM
Original Filed May 13, 1958
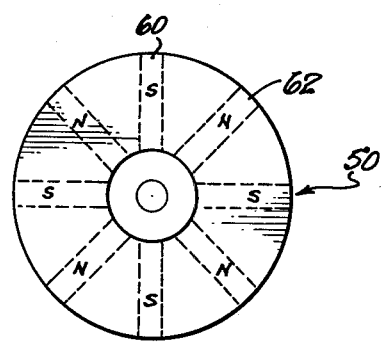
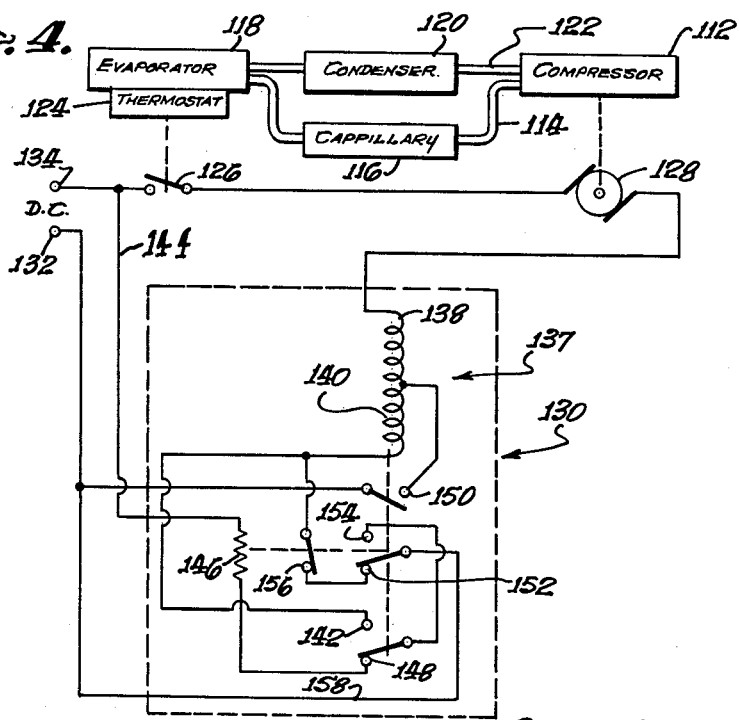
GUSTAV H. SUDMEIER,
INVENTOR.
BY Nilsson & Robbins
ATTORNEYS.

United States Patent Office 3,195,035
Patented July 13, 1965

3,195,035
MOTOR CONTROL SYSTEM
Gustav H. Sudmeier, 2768 Torrance Blvd.,
Torrance, Calif.
Original application May 13, 1958, Ser. No. 735,008, now Patent No. 3,080,495. Divided and this application June 7, 1961, Ser. No. 115,364
5 Claims. (Cl. 318—472)

This invention relates to a control system for use as with a fluid compressor apparatus and is a divisional of pending patent application, Serial No. 735,008, filed May 13, 1958, now Patent No. 3,080,459 and entitled Compressor Apparatus.

An ever-present problem in refrigeration systems of the type employing a compressor and circulating refrigerant, lies in the loss of refrigerant from the system and particularly from the compressor. It has previously been proposed to avoid the loss of refrigerant in systems of this type by enclosing the compressor in a hermetically-sealed chamber. However, to avoid the existence of a drive shaft passing through the sealed chamber, it has been customary to enclose the motor as well as the compressor. Although arrangements of this type render the motor inaccessible for maintenance, requiring degasification of the system to gain access to the motor, such systems provide a considerably-improved arrangement, if alternating-current motors are employed. However, if direct-current motors are used, this arrangement does not provide a solution. Electrical arcing is invariably present in a direct-current motor, for example at the commutator, and if a direct-current motor is enclosed in an atmosphere of refrigerant, the arcing is likely to form various acids which are corrosive to the refrigeration system. Therefore, compressors which employ direct-current electrical motors have not generally been housed in hermetically-sealed chambers, and as a result losses of refrigerant have been tolerated.

The present invention is applicable to a refrigeration system utilizing a small compressor which is hermetically-sealed apart from the driving motor. In the apparatus, the driving motor is coupled to the compressor through a sealed non-ferrous plate, by employing magnetic coupling to effect synchronous drive between the motor and the compressor, i.e. coupling without slip. In such a system, if the compressor falls out of synchronism with the motor, the coupling is broken and could not be immediately re-established due to the speed differences of the motor and compressor and the load presented by the compressor. The present invention is directed to a control system which functions to sense the occurrence of a break in the magnetic coupling, to de-energize the motor for a brief interval whereby the motor may come to a stop and allow the magnetic coupling to become re-established, after the compressor has balanced out, or other changes occur.

It is therefore an object of the present invention to provide an improved control system for use in conjunction with a disengageable coupling, which functions to control a driving means in a manner so that the driving means is stopped temporarily in the event of a break in the coupling, to thereby allow automatic restoration of the coupling after a timed interval.

This and other objects and advantages of the present invention will become apparent from the following specification and accompanying drawings in which:

FIG. 1 is a perspective view of a compressor unit incorporating the principles of the present invention;

FIG. 2 is an enlarged vertical sectional view taken along the line 2—2 of FIG. 1;

FIG. 3 is a partial vertical sectional view taken along the line 3—3 of FIG. 2; and FIG. 4 is a diagrammatic representation of a refrigeration system and an electrical control system incorporating the principles of the present invention.

Referring now to the drawings and particularly to FIG. 1 thereof, there is shown a direct-current motor 10 having a housing 12 mounted thereon. The housing 12 contains a control circuit (hereinafter described) and provides a pair of terminals 14 which are adapted to be connected to a source of direct-current power to energize the motor 10. The motor 10 is rigidly affixed and coupled to a compressor 16. The integrated unit formed by the compressor 16, the motor 10, and the control unit 12 is supported on mounting brackets 18 and 20.

A fan 22 is connected to the shaft of the motor 10, at the end remote from the compressor 16. The fan 22 functions to circulate air about the motor 10 and the compressor 16 to maintain these units at a satisfactory operating temperature.

In the operation of the compressor, fluid, e.g. gaseous refrigerant, is drawn into the compressor 16 through a tube 24 at a relatively low pressure and exhausted from the compressor through a tube 26 at a relatively high pressure. Of course, the gaseous fluid from the tube 26 may be employed in refrigeration apparatus as hereinafter described.

Reference will now be made to FIG. 2 for a consideration of the manner in which the motor 10 is coupled to drive the compressor 16. The motor 10 has a divided housing formed of a major housing 28, constructed in accordance with conventional motor techniques, and an end housing cap 30 which carries a bearing 32 that in turn supports the drive shaft 34 of the motor. A pair of bolts 35 serve to hold the cap 30 to the housing 28. Thus the operating components of the motor are readily accessible simply by removing the bolts 35.

A backing plate 36 is affixed to the drive shaft 34 of the motor 10 by a set screw 38. The plate 36 is formed of ferrous material and is circular in form. A toroid 40, formed of ferrite material, is rigidly affixed upon the backing plate 36. Of course, other ferrous materials, having considerable magnetic retentivity may also be used in forming the toroid 40. In the event that the toroid 40 is formed of a ferrite material, it may be affixed to the plate 36 by a synthetic resin adhesive.

The motor 10 is held in rigid engagement with the compressor 16 by a plurality of studs 42 which pass through an external rim of the cap 30 and a circular non-ferrous plate 44 to threadably engage an end section 46 of the compressor housing. The non-ferrous plate 44 may for example, be formed of fiberglass impregnated with synthetic resin. The separator or plate 44 has a center section 48 of increased thickness which is concentric to the plate. The motor 10 is affixed to the compressor 16 so that the toroid 40 is positioned contiguous to the plate 44, and the center section 48 lies within the toroid 40. The center section 48 of the plate 44 reinforces the plate against flexing under pressure and rubbing against the revolving members as the toroid 40.

At the compressor side of the plate 44 a toroid 50 is positioned, which also receives the center section 48 of the plate 44. The toroid 50 is similar to the toroid 40 and is affixed upon a backing plate 52 which is in turn mounted upon a shaft 54 of the compressor and there held by a set screw 56.

A counterbalance 58, in the form of a circular segment, is adhered to the compressor side of the plate 52 to offset the weight of the reciprocating portion of the compressor. This member may consist of resin impregnated fiberglass, and adhered to the plate 52 by resin.

The toroids 40 and 50 contain a magnetic pattern as shown in FIG. 3, which includes a number of alternate north and south-pole radially-extending magnetized areas 60 and 62.

Referring now to FIG. 2, it may be seen that the magnetic coupling between the toroids 40 and 50 positioned in faced-opposing relationship includes a number of magnetic circuits, e.g. eight circuits which pass through the backing plates 36 and 52, the toroids 40 and 50, and the non-magnetic gap including the plate 44. In the operation of the coupling, the toroids 40 and 50 are locked together by the magnetic lines of force in these magnetic circuits, therefore the energy of motion which appears at the shaft 48 is transferred through the magnetic coupling to the shaft 54.

In the operation of the unit the motor 10 revolves the shaft 34 which is coupled to the shaft 54 through the plate 44 by the toroids 40 and 50 and by magnetic flux. Revolution of the compressor shaft 54 drives the compressor 16 to perform the compressing operation and produce a pressure differential between the tubes 24 and 26.

Referring now to FIG. 4, the control system of the present invention will be considered. A compressor 112, which may be as described above, is connected to a condenser 120. The condenser is in turn connected to an evaporator 118 which is connected to the compressor 112 to form a conventional refrigeration system. A thermostat 124, associated with the evaporator 112 functions to control a switch 126 to selectively energize the system in accordance with the temperature of the evaporator 118. A capillary 116, along with the evaporator 118 and the condenser 120 may take the form of standard refrigeration system components and, as previously indicated, the compressor 112 may comprise a compressor as previously described herein. The compressor 112 is mechanically coupled to a motor 128 which may be the motor 10 and which operates the compressor in accordance with the temperature of the evaporator 118, under control of the switch 126 and a control circuit 130.

In the control circuit 130, a pair of terminals 132 and 134 are adapted to be connected to a source of direct current power as through terminals 14 (FIG. 1). The terminal 134 is connected through the thermostat-controlled switch 126 to one terminal of the motor 128. The other terminal of the motor 128 is connected to a relay having a hold coil 138 and an actuating coil 140. The actuating coil of the relay is connected to the stationary terminal of contacts 142 of the relay. The terminal 134 is also connected through a line 144 and a resistance heating element 146 to the stationary contact of contacts 148. The other terminal 132 is connected to the movable contact of contacts 150 and to the movable contact of contacts 152. The movable contact of contacts 152 also engages a second stationary contact to form contacts 154.

In the operation of the system, the resistance element 146 functions to heat a bimetallic blade of the type well-known in the art, which comprises the movable contact of the contacts 156. Heating of the blade opens the contacts 156. Additionally, the bimetallic blade is mechanically coupled (as indicated) to the movable contact of contacts 152 and prevents the closure of contacts 152 until the bimetallic blade is heated to a predetermined temperature.

An understanding of the control circuit may now best be effected by considering a cycle of operation thereof. Therefore, assume that the terminals 132 and 134 are connected to a source of direct current and that the temperature of the evaporator 118 has reached a level so that the thermostat 124 functions to close the switch 126. Electrical current then flows from the terminal 134, through the switch 126, the motor 128, the hold coil 138, the activate coil 140, the contacts 156 and 152 then through the conductor 158 back to the terminal 132. During the initial surge of this current, the contacts of the relay 137 are raised by the activate coil 140 thereby closing the contacts 150, 154, and 142 and opening the contacts 152 and 148. Upon the completion of this switching operation, it is to be noted that the activate coil 140 is shorted out through the contacts 150.

The motor 128 now continues to run with the control circuit 130 consuming essentially no energy, the only energy being that required to maintain the relay 137 energized by the current through the hold coil 138.

Assume now that for some reason the coupling between the motor 128 and the compressor 112 fails and the motor 128 begins to run under no load conditions. Upon this occurrence the current through the motor 128 will decrease substantially as will the current in the serially-connected hold coil 138. As a result, the movable contacts of the relay 137 drop to the lower position opening the contacts 150 and 142 and closing the contacts 148. Of course, as previously indicated, the contacts 154 are held closed while the contacts 152 are prevented from closing until such time as the bimetallic blade associated with the thermal heating element 146 reaches a predetermined temperature.

With the contacts in the above-described state, the thermal element 146 is energized by current passing from the terminal 134, through the line 144, the element 146, contacts 148, contacts 154 and the line 158. After a predetermined interval, during which the motor 128 stops and the pressures in the compressor 112 balance out, the heating element 146 heats the bimetallic element to an adequate temperature to open the contacts 156, and allow the contacts 152 to close. Upon this occurrence the current passing through the contacts 154 is interrupted and the resistance element 146 is de-energized. However, the contacts 156 remain open for a brief interval until such time as the bimetallic blade associated with the element 146 cools sufficiently to enable the contacts 156 to again close. Upon closure of the contacts 156 the motor 128 is again energized in the manner first described.

Of course, it is to be understood that the time delay may be varied to allow various periods for the magnetic coupling to become re-established. Such variations may be effected in accordance with well-known practices either by varying the resistance heating element 146 or the bimetallic blade associated therewith.

It may therefore be seen, that in the event that the motor 128 becomes decoupled from the compressor 112 for any reason, or if coupling is never effected due to the system attempting to operate prior to the balancing of pressures in the compressor, the control system 130 senses such an occurrence and temporarily delays the operation of the motor 28, enabling the system to prepare for a subsequent start-up operation.

An important feature of the control system of the present invention resides in the mode of operation which does not require substantial energy demands during non-operating intervals.

It should be noted that although the particular embodiment of the invention herein shown and described is fully capable of providing the advantages and achieving the objects previously set forth, such embodiment is merely illustrative of this invention and therefore modifications and changes may be made thereto without departing from the spirit of the invention or the scope of the following claims.

I claim:

1. An electrical system adapted to be connected to a source of electrical energy, for use in conjunction with electrical motive means which is subject to encounter loaded and no-load conditions, said system for temporarily disconnecting said electrical motive means from said source of electrical energy, upon occurrence of said no-load condition, comprising: an electromagnetic relay drive, connected to be energized under control of electrical energy passing from said source to said motive means; a thermo relay drive operative after a predetermined period of delay; and switching means controlled by said electromagnetic relay drive and said thermo relay drive, for connecting only said motive means and said electromagnetic relay drive to receive energy from said source when said motive means is loaded, for connecting only said thermo relay drive to receive energy from said source when said motive means becomes not loaded, and for isolating said energy source for a delay interval after said thermo relay drive has received energy from said source for a predetermined period of delay after which said motive means and said electromagnetic relay drive are connected to receive energy from said source.

2. An electrical system according to claim 1 wherein said switching means includes at least one set of contacts which is controlled jointly by said electromagnetic relay drive and said thermo relay drive.

3. An electrical system according to claim 1 wherein said switching system includes: at least one set of contacts controlled by said electromagnetic relay driver, at least one set of contacts controlled by said thermo relay driver, and at least one set of contacts controlled jointly by said electromagnetic relay driver and said thermo relay driver.

4. An electrical system adapted to be connected to a source of electrical energy, for use in conjunction with electrical motive means which is subject to encounter loaded and no-load conditions, said system for temporarily disconnecting said electrical motive means from said source of electrical energy, upon occurrence of said no-load condition, comprising: electromagnetic sensing means to sense and manifest the loaded and no-load conditions of said motive means; thermo delay means for manifesting a first delay interval during heating and a second delay interval during cooling; and switching means controlled by said electromagnetic sensing means and said thermo delay means, for connecting said electromagnetic sensing and said motive means to said source upon said electromagnetic sensing means manifesting a loaded condition, for isolating said sensing means and said motive means from said source and connecting said thermo delay means to said source to initiate said first delay interval, for isolating said sensing means, said motive means and said delay means from said source at the conclusion of said first delay interval, to initiate said second delay interval, and for connecting said sensing means and said motive means to said source at the conclusion of said second delay interval.

5. An electrical system adapted to be connected to a source of electrical energy, for use in conjunction with electrical motive means which is subject to encounter loaded and no-load conditions, said system for temporarily disconnecting said electrical motive means from said source of electrical energy, upon occurrence of said no-load condition, comprising: electrical sensing means for manifesting said loaded and no-load conditions of said motive means dependent upon the quantity of energy passing from said source to said motive means; electrical timing means for providing a first time interval between an instant of energization and a first instant of manifestation, and a second time interval between an instant of deenergization and a second instant of manifestation; and switching means controlled by said electrical sensing means and said electrical timing means, for disconnecting said sensing means and said motive means from said source and connecting said timing means to said source upon the occurrence of said no-load condition, to thereby initiate said first time interval, for disconnecting said timing means from said source at said first instant of manifestation, and for connecting said sensing means and said timing means to said source at said second instant of manifestation.

References Cited by the Examiner

UNITED STATES PATENTS 2,687,693 8/54 Hudson _____ 230—17
2,774,929 12/56 Schaefer _____ 318—474

MILTON O. HIRSHFIELD, *Primary Examiner.*

DAVID X. SLINEY, *Examiner.*